(12) United States Patent
Xu et al.

(10) Patent No.: US 12,223,016 B2
(45) Date of Patent: Feb. 11, 2025

(54) SYSTEM AND METHOD USING MACHINE LEARNING FOR AUTOMATED CASING AND/OR TUBING INSPECTION LOG INTERPRETATION

(71) Applicant: Saudi Arabian Oil Company, Dhahran (SA)

(72) Inventors: Chicheng Xu, Houston, TX (US); Weichang Li, Houston, TX (US); Olanrewaju A. Abudu, Dhahran (SA); Shouxiang Mark Ma, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 475 days.

(21) Appl. No.: 17/659,215

(22) Filed: Apr. 14, 2022

(65) Prior Publication Data

US 2022/0335253 A1    Oct. 20, 2022

Related U.S. Application Data

(60) Provisional application No. 63/175,738, filed on Apr. 16, 2021.

(51) Int. Cl.
*G06K 9/62* (2022.01)
*G06F 16/55* (2019.01)
(Continued)

(52) U.S. Cl.
CPC .......... *G06F 18/2431* (2023.01); *G06F 16/55* (2019.01); *G06T 7/001* (2013.01);
(Continued)

(58) Field of Classification Search
CPC ........ G06F 18/20; G06F 18/214; G06F 18/24; G06F 18/243; G06F 18/2431;
(Continued)

(56) References Cited

U.S. PATENT DOCUMENTS 4,701,892 A    10/1987 Anderson
4,744,030 A    5/1988 Carlson et al.
(Continued)

FOREIGN PATENT DOCUMENTS

WO    WO 2008042197    4/2008
WO    WO 2019084219    5/2019

OTHER PUBLICATIONS

SAIP Examination Report in Saudi Arabian Appln. No. 122430949, dated Sep. 19, 2023, 14 pages (with English translation).
(Continued)

*Primary Examiner* — Duy M Dang
(74) *Attorney, Agent, or Firm* — Fish & Richardson P.C.

(57) ABSTRACT

A computer-implemented method includes: accessing a first database holding information encoding a set of labels that specify a condition of at least one of: a surface pipe, or an underground enclosure that runs at a plurality of depth locations; accessing a second database holding a plurality of inspection logs that record measurement data of the surface pipe or underground enclosure; based on, at least in part, the labeling information and the plurality of inspection logs, training a deep learning model configured to classify, into the set of labels, the condition of the surface pipe or underground enclosure when presented with the inspection logs; applying the deep learning model to one or more newly received inspection logs containing measurement data of a new surface pipe or a new underground enclosure; and subsequently classifying, into the set of labels, the condition of the new surface pipe or the new underground enclosure.

20 Claims, 6 Drawing Sheets

(51) Int. Cl.
*G06F 18/2431* (2023.01)
*G06T 7/00* (2017.01)
*G06V 10/764* (2022.01)
*G06V 10/82* (2022.01)

(52) U.S. Cl.
CPC ............ *G06V 10/764* (2022.01); *G06V 10/82* (2022.01); *G06T 2207/20036* (2013.01); *G06T 2207/20084* (2013.01); *G06T 2207/30108* (2013.01)

(58) Field of Classification Search
CPC .................... G06F 16/55; G06T 7/001; G06T 2207/20036; G06T 2207/20084; G06T 2207/30108; G01V 1/40; G01V 1/50; G01V 1/46; G01V 2210/1299; G01V 2210/1429; G01V 2210/324; G01V 2210/62; G06V 10/764; G06V 10/82; E21B 47/005; E21B 2200/00; E21B 2200/22; G06N 3/08; G06N 3/0472; G06N 20/10
See application file for complete search history.

(56) References Cited

U.S. PATENT DOCUMENTS

| | | | |
|---|---|---|---|
| 6,896,056 | B2 | 5/2005 | Mendez et al. |
| 2010/0206064 | A1 | 8/2010 | Estes |
| 2017/0362925 | A1 | 12/2017 | Zhang |
| 2019/0147125 | A1 | 5/2019 | Yu et al. |
| 2019/0383965 | A1 | 12/2019 | Salman et al. |
| 2020/0378239 | A1 | 12/2020 | Jones et al. |
| 2021/0102457 | A1* | 4/2021 | Dupont .................... G01V 1/50 |

OTHER PUBLICATIONS

Ronneberger et al., "U-Net: Convolutional Networks for Biomedical Image Segmentation," in Navab et al., Medical Image Computing and Computer-Assisted Intervention—MICCAI 2015, MICCAI 2015, Lecture Notes in Computer Science, 2015, 9351, 8 pages.

* cited by examiner

SYSTEM AND METHOD USING MACHINE LEARNING FOR AUTOMATED CASING AND/OR TUBING INSPECTION LOG INTERPRETATION

RELATED APPLICATION

This application claims the benefit of priority to U.S. Provisional Application No. 63/175,738, filed Apr. 16, 2022 under 35 USC § 119(e), the entirety of which is incorporated by reference.

TECHNICAL FIELD

This disclosure generally relates to processing inspection logs to determine the integrity of underground casing and/or tubing and surface metal pipes.

BACKGROUND

Oil and gas production fields generally deploy a large number of pipes such as subsurface well completion casing and production tubing. Maintaining the integrity and reliability of these pipes can be part of the daily operations of the facilities. For example, preventing failures such as deformation, physical wear and corrosion can be a precondition to successful field operations; production of reservoir fluids, injection of water and other fluids, or surveillance of performance of the well and reservoir.

SUMMARY

In one aspect, some implementations provide a computer-implemented method that includes: accessing a first database holding information encoding a set of labels, wherein the set of labels specify a condition of at least one of: a surface pipe, or an underground enclosure, wherein the underground enclosure includes a casing or a tubing, either of which runs at a plurality of depth locations; accessing a second database holding a plurality of inspection logs, wherein the plurality of inspection logs record measurement data of the at least one of the surface pipe or the underground enclosure that runs at the plurality of depth locations; based on, at least in part, the set of labels and the plurality of inspection logs, training a deep learning model configured to classify, into the set of labels, the condition of the at least one of the surface pipe or the underground enclosure at the plurality of depth locations when presented with the inspection logs; applying the deep learning model to one or more newly received inspection logs containing measurement data of a new surface pipe or a new underground enclosure; and subsequently classifying, into the set of labels, the condition of the new surface pipe or the new underground enclosure.

Implementations may include one of more of the following features.

The condition of the surface pipe or the underground enclosure may characterize an integrity state of the surface pipe or the underground enclosure. The set of labels of the first database may be generated based on, at least in part, input from one or more human experts when presented with at least portions of the inspection logs.

The plurality of inspection logs may include logs from at least one of: a multi-finger cased-hole caliper tool, a flux-leakage tool, an electromagnetic (EM) phase shift tool, and an ultrasonic imaging tool. The plurality of inspection logs may include at least one of a low-frequency thickness image and at least one of a high-frequency discrimination image. The low-frequency thickness image and the high-frequency discrimination image may be based on, at least in part, the EM phase shift tool.

The deep learning model may include a UNet classifier. The UNet classifier may include: a first stage configured to perform a pixel-level classification and classify each pixel or each patch of pixels into one of a set of integrity labels, and a second stage of using morphological patterns to discriminate defect patterns according to a respective size of each defect pattern. The deep learning model may include a patch-based image classifier configured to operate on patches of pixels. The patch-based image classifier incorporates a convolutional neural network (CNN) classifier. The CNN classifier may include: classifying patches of each inspection image into one of a set of integrity states; assigning the classified integrity state to a center pixel of the patch; and averaging over adjacent patches.

In another aspect, some implementations provide a computer system comprising one or more computer processors configured to perform operations of: accessing a first database holding information encoding a set of labels, wherein the set of labels specify a condition of at least one of: a surface pipe, or an underground enclosure, wherein the underground enclosure includes a casing or a tubing, either of which runs at a plurality of depth locations; accessing a second database holding a plurality of inspection logs, wherein the plurality of inspection logs record measurement data of the at least one of the surface pipe or the underground enclosure that runs at the plurality of depth locations; based on, at least in part, the set of labels and the plurality of inspection logs, training a deep learning model configured to classify, into the set of labels, the condition of the at least one of the surface pipe or the underground enclosure at the plurality of depth locations when presented with the inspection logs; applying the deep learning model to one or more newly received inspection logs containing measurement data of a new surface pipe or a new underground enclosure; and subsequently classifying, into the set of labels, the condition of the new surface pipe or the new underground enclosure.

Implementations may include one of more of the following features.

The condition of the surface pipe or the underground enclosure may characterize an integrity state of the surface pipe or the underground enclosure. The set of labels of the first database may be generated based on, at least in part, input from one or more human experts when presented with at least portions of the inspection logs.

The plurality of inspection logs may include logs from at least one of: a multi-finger cased-hole caliper tool, a flux-leakage tool, an electromagnetic (EM) phase shift tool, and an ultrasonic imaging tool. The plurality of inspection logs may include at least one of a low-frequency thickness image and at least one of a high-frequency discrimination image, The low-frequency thickness image and the high-frequency discrimination image may be based on, at least in part, the EM phase shift tool.

The deep learning model may include a UNet classifier. The UNet classifier may include: a first stage configured to perform a pixel-level classification and classify each pixel or each patch of pixels into one of a set of integrity labels, and a second stage of using morphological patterns to discriminate defect patterns according to a respective size of each defect pattern. The deep learning model may include a patch-based image classifier configured to operate on patches of pixels. The patch-based image classifier incorporates a convolutional neural network (CNN) classifier. The CNN classifier may include: classifying patches of each inspection image into one of a set of integrity states; assigning the classified integrity state to a center pixel of the patch; and averaging over adjacent patches.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
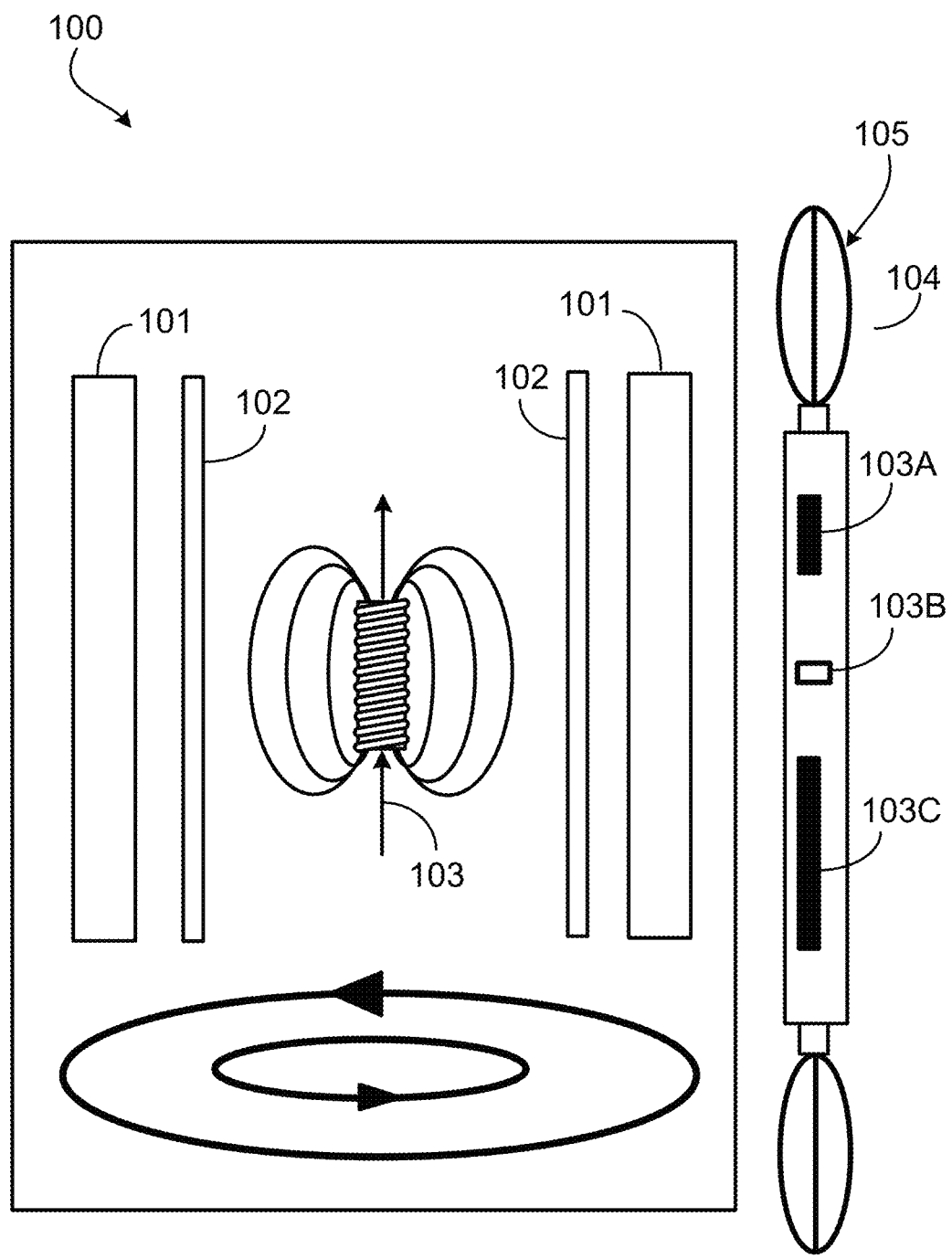
FIG. 1 illustrates an example of an electromagnetic (EM) corrosion logging tool configuration.

Early detection of casing/tubing integrity can enable speedy intervention to timely remedy defects such as corrosion. The ability to detect early and intervene timely can not only greatly save operational cost, but also significantly reduce, if not eliminate, safety incidents in the oilfield. Currently, interpretation of corrosion logs, such as electromagnetic (EM) corrosion logs, is subject to manual inspection. For example, the image presentation of pipe thickness and discrimination is manually performed by subject matter experts. The process can be time-consuming, subjective, and often error-prone. Given the surging number of cased wells logs such as EM corrosion logs and ultrasonic logs, some implementations provide a computer-implemented approach to enhance the efficiency, consistency, as well as accuracy when interpreting the logs.

The implementations can automate the interpretation of casing/tubing inspection logs such as the corrosion logs by integrating all the available log measurement information, such as multi-finger caliper logs, the casing and/or tubing summary report, low-frequency pipe thickness image, and high-frequency discrimination image. In various implementations, the interpretation can leverage machine learning models and algorithms, such as a deep learning classifier. For example, labels of various pipe integrity issues and features can be recorded in a database and then used as the training dataset. A machine learning classification model, for example, a U-Net based classifier can be trained using the large training dataset. Once validated, the model can be incorporated into a computer-implemented data analytic engine to interpret additional casing and/or tubing inspection logs such as corrosion logs efficiently, consistently and robustly to deliver highly accurate results.

The implementations can obtain casing and/or tubing inspection logs from field data acquisition. The inspection logs can include measurement logs from electromagnetic phase shift tools, ultrasonic imaging tools, multi-finger cased-hole caliper tools, and flux-leakage tools.

Electromagnetic (EM) based wireline corrosion logging tools are more frequently run in cased wells to monitor the integrity of pipes such as casing or tubing. EM corrosion log tools can deliver valuable monitoring data while running in hole. In some cases, a continuous log of the average casing and/or tubing inner diameter and total metal thickness are recorded, either in a single or multiple casing and/or tubing strings. EM corrosion logging tools can thus produce both low-frequency thickness image and high-frequency discrimination image. In addition, a detailed casing and/or tubing summary report (CSR) may be produced from single-string casing and/or tubing surveys, listing average metal loss, maximum penetration, and data histograms. Combined interpretation of the low-frequency thickness image and the high-frequency discrimination image may enable determining whether an observed metal loss is from the inner tubing wall or elsewhere.

Referring to FIG. 1, a schematic diagram 100 illustrates an example of an EM corrosion logging tool configuration, Casing 101 may represent the wall of a pipe. Tubing 102 may likewise represent the wall of a pipe. A tool assembly 105 may be inserted into the inner bore of casing 101, Tool assembly 105 may include centralizers 104 and coils 103. Centralizers 104 may be metallic and mounted outside an area that houses coils 103. Coils 103 may include short vertical coil 103A, transverse coil 103B, and long vertical coil 103C. Each coil configuration can generate a field of magnetic flux in a circular fashion. The distribution of the magnetic flux is affected by the casing and/or tubing. In other words, alterations of the magnetic flux can indicate an integrity of the casing and/or tubing. Flux leakage is a semiquantitative method that uses a strong magnetic field to identify and, to a certain extent, quantify localized corrosion on both the inner and the outer surfaces of the casing and/or tubing In ultrasonic tools, echo amplitude and travel time can provide images of the inside casing and/or tubing surface conditions. Based on the images, various implementations can analyze the buildup, defects, and roughness such as pitting and gouges. Such analysis, when coupled with travel-time and resonant-frequency analysis, can provide casing and/or tubing thickness measurements. Multi-finger calipers are used to identify changes in casing and/or tubing diameter as indicators of wear and corrosion, as well as monitor casing and/or tubing deformation.

The implementations access the casing and/or tubing inspection logs. In some cases, the casing and/or tubing inspection logs can be visualized and saved as, for example, JPEG files. The implementations may then build a database showing the labeling of all common pipe integrity issues and features as well as the corresponding responses in well integrity monitoring measurements from a large number of wells. Example of the pipe integrity issues include: casing and/or tubing split, metal loss, perforation holes, and blank pipe.

Figure 2:
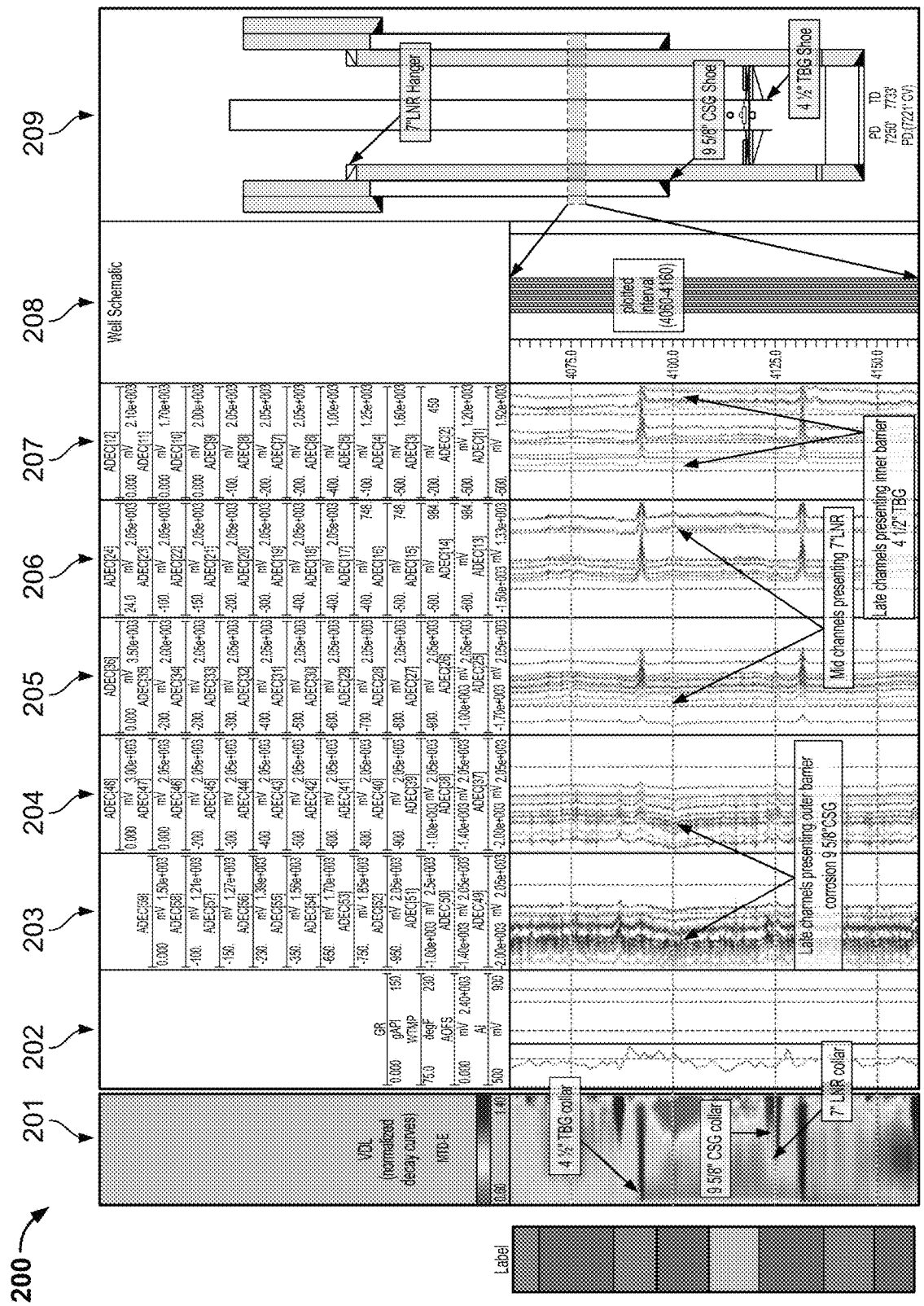
FIG. 2 illustrates examples of labeling pipe integrity based on EM corrosion logs by a human expert.

As illustrated in example 200 of FIG. 2, inspections logs can be obtained from a number of log files. Panel 201 shows variable density log (VDL) of normalized decay curves as a function of depth. Further referring to panel 209, which shows a profile of a tool and borehole configuration, panel 201 particularly shows regions that correspond to the 4¼" TBG collar, the 9⅝" CSG collar, and the 7" LNR collar. In this example, TBG refers to tubing, CSG stands for casing, and LNR means liner. Panel 208 shows a schematic for the well structure illustrated in the example 200. Panel 202 shows examples of logging data from the depth direction. The examples include gamma ray (GR) measurements, temperature (Wtemp) measurements, and offset for sensor measurements. Examples of sensor measurements can be around hundreds of milliampere. In particular, sensor measurements can be calculated on the surface based on the difference between the decay curve from the positive value and the decay curve from the negative value. Panels 203 to 207 show measurement data from sensors on the tool configuration of panel 209. The measurement data is displayed as vertical traces for the various sensors. As indicated in panels 203 and 204, the late channels present outer barrier corrosion in the 9" CSG. In panels 205 and 206 show indications of the mid channels presenting the 7" LNR. Panel 207 show late channels presenting the inner barrier 4½" TBG. The labeling performed by the human expert based on the collection of EM logs, as shown in panels 201 to 207.

Figure 3:
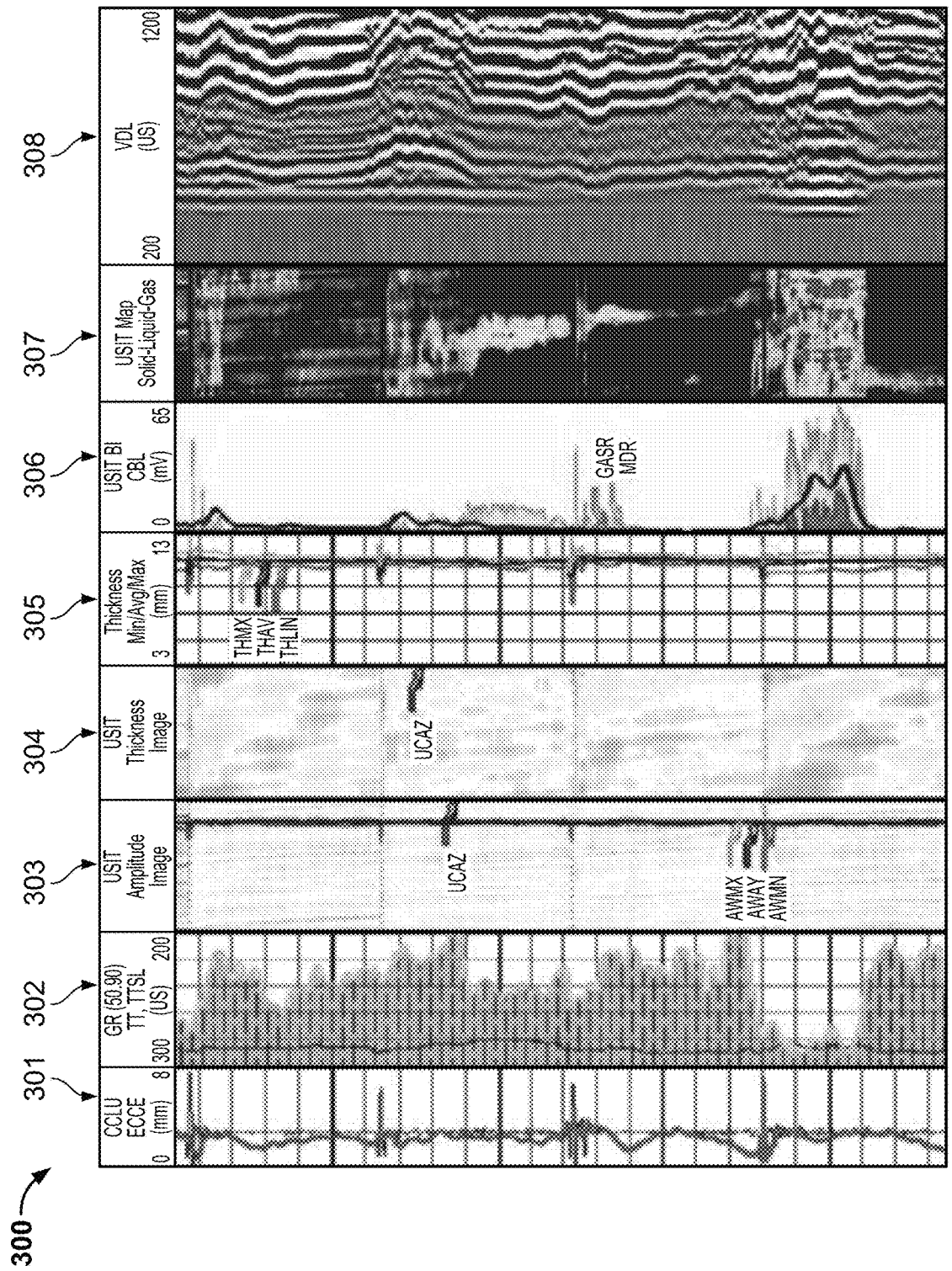
FIG. 3 illustrates an example of ultrasonic casing and/or tubing-evaluation data, as used by some implementations of the present disclosure.

FIG. 3 shows an example 300 of ultrasonic casing and/or tubing-evaluation data, as used by some implementations of the present disclosure. In this example, panel 301 shows diameters of eccentricity as a function of the depth. In particular, the casing collar locator (CCLU) eccentricity curve (ECCE) is derived from the ultrasound imaging tool (USIT). Panel 302 shows examples of gamma ray ((GR) for depth correlation, transit time and transit time sliding gate for cement bond log (CBL) as a function of depth. Panel 303 shows an example of the USIT amplitude image as a function of the depth. In this example, the amplitude image can identify casing internal rugosity. Panel 304 shows an example of an ultrasound thickness image as a function of depth. Panel 305 shows an example of a thickness curve (including min/average/max) as a function of depth to identify external corrosion in the casing. Panel 306 shows an example of CBL data in my. Panel 307 shows an example of cement impedance map for USIT. Panel 308 shows an example of a variable density log (VDL) to inspect cement formation interface bond. These panels of FIG. 3 present the casing and/or tubing radius and shape as log curves and image maps. The results can indicate deformation in the casing and/or tubing.

Various implementation may assemble the labeling database include the inspection logs and labeling by human expert, which can be cross validated as the ground truth. Once the labeling database is assembled, implementations may train machine learning models such as deep learning neural networks based on the labeling database to map the low-frequency thickness and high-frequency discrimination images to the labels.

In one example, implementations may apply a multiclass segmentation technique based on U-Net, which is a specialized convolutional neural network, to inspection log images. In particular, the multiclass segmentation technique can classify each pixel or pixel patch into one of several integrity states, such as normal, pitting, and large area metal loss. For various implementations, training can be performed in stages. For example, for an implementation incorporating U-Net, the first stage can be a pixel-level classification into a set of simple integrity state labels. The first stage may be followed by a second stage where the morphological patterns are used to discriminate small versus large defect patterns that are semantically meaningful to operation. The training of such as two-stage model can be done separately or in combination, depending on various scenarios with different data and label availability.

Figure 4:
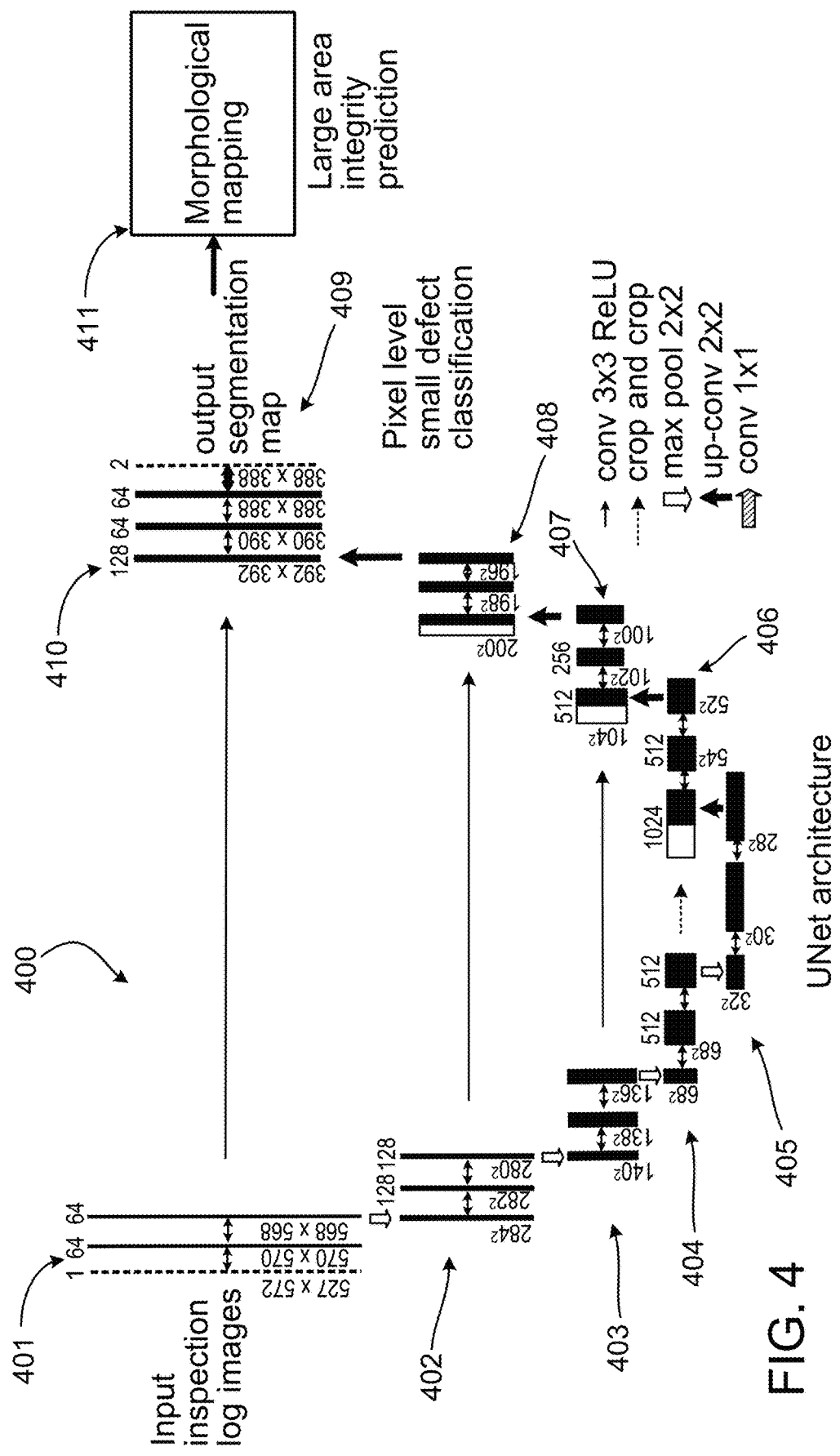
FIG. 4 illustrates an example of a customized deep learning UNET model according to an implementations of the present disclosure.

Referring to FIG. 4, diagram 400 shows an example of a U-Net (REF-1) architecture adapted for some implementations of the present disclosure. In this example, block 401 shows that a collection of input inspection log images are assembled. Each image may be taken from a depth location indicated in FIGS. 2 and 3. As illustrated, an input image of a size of 572×572 may be subject to cascaded structure of contracting path followed by an expanding path. In this example, the contracting path can include a series of convolutional layers followed by Max pooling and dropout operation. The convolutional layers consists of a number of convolution filters performing convolution of kernel size of, for example, 3×3 pixels, followed by an activation function, for example, a rectified linear unit (ReLU). The convolution filters may generate images of size, for example, 64×570×570, and then 64×568×568, after padding. Here 64 is the number of filters (channels) and 570×570 and 568×568 represent number of pixels for the image size for each channel, In this example, as illustrated in block 402, the image set of 64×568×568 can be subject to a max pooling operation that down-samples the images spatially by performing, for example, a MAX operation within a mask of size 2×2. The subsequent image can be reduced to a size of 284×284. The image may then be subject to 128 convolution filters performing a convolution of size 3×3, thus generating images with trimmed sizes, for example, 128×282×282, and then 128×280×280. In block 403, the image set of 128× 280×280 can be subject to a pooling operation that down-samples the images spatially by performing, for example, a MAX operation within a mask of size 2×2. The subsequent image can be reduced to a size of 140×140. The image may then be subject to a convolution filter performing a convolution of size 3×3, thus generating images with trimmed sizes, for example, 256×138×138, and then 256×136×136. In block 404, the image set of 256×136×136 can be subject to a pooling operation that down-samples the images spatially by performing, for example, a MAX operation within a mask of size 2×2. The subsequent image can be reduced to a size of 68×68. The image may then be subject to a convolution filter performing a convolution of size 3×3, thus generating images with trimmed sizes, for example, 512× 66×66, and then 512×64×64. In block 405, the image set of 512×64×64 can be subject to a pooling operation that down-samples the images spatially by performing, for example, a MAX operation within a mask of size 2×2. The subsequent image can be reduced to a size of 32×32. The image may then be subject to a convolution filter performing a convolution of size 3×3, thus generating images with trimmed sizes, for example, 1024×30×30, and then 1024× 78.

Subsequently, in block 406 of this example, the image set of size 1024×28×28 can be subject to an up-sampling convolution filter to generate an image set of 1024×56×56, the left half of which can be zero-padded. The image set may then be subject to a convolution filter performing a convolution of size 3×3, thus generating images with trimmed sizes, for example, 512×54×54, and then 512×52×52. In block 407 of this example, the image set of size 512×52×52 can be subject to an up-sampling convolution filter to generate an image set of 512×104×104, the left half of which can be zero-padded. The image set may then be subject to a convolution filter performing a convolution of size 3×3, thus generating images with trimmed sizes, for example, 256× 102×102, and then 256×100×100. In this example, as illustrated in block 408 of this example, the image set of size 256×100×100 can be subject to an up-sampling convolution filter to generate an image set of 256×200×200, the left half of which can be zero-padded. The image set may then be subject to a convolution filter performing a convolution of size 3×3, thus generating images with trimmed sizes, for example, 128×198×198, and then 128×196×196. As illustrated in block 409 of this example, the image set of size 128×196×196 can be subject to an up-sampling convolution filter to generate an image set of 128×392×392, the left half of which can be zero-padded. The image set may then be subject to a convolution fitter performing a convolution of size 3×3, thus generating images with trimmed sizes, for example, 64×390×390, and then 64×388×388, as illustrated in block 410 of this example. An output segmentation map of size 2×388×388 can thus be generated for morphological mapping 411. The architecture can incorporate pixel level or small defect classification in the morphological mapping for large area integrity mapping.

In another example, the implementations can use patch based image classifiers such as those based on convolutional neural network (CNN) where each casing and/or tubing inspection image patch are classified into one of the integrity states and then assigned to the center pixel of the patch of pixels, and averaged over adjacent patches. In various examples, the image patches may overlap in space. The integrity state of each pixel can be determined from the patch classification label where this pixel is at the center location. Alternatively or additionally, the classification output can be taken from all the image patches that covers the pixel of interest. The latter can be more robust in cases where the integrity feature has a certain morphological area that is not captured by a single image patch. The size of the image patch in this example may be chosen based on the typical resolution for integrity state of interest.

In various implementations, the labeling database can be a training ground for the deep learning models of the present disclosure. In other words, the implementations can utilize deep learning to develop image classification based on labeling provided by human expert on existing inspection log data. The labeling database can expand as more labeling data is available. Human expertise can be leveraged and then extrapolated to image data and new data. The models can be developed based on high-quality data of known labeling. Once the model is validated, the model can be embedded in a computer-implemented software tool with graphic user interface that performs the machine learning based classification/segmentation. For example, when a well has EM corrosion logs and ultrasonic logs to be interpreted, the user can prepare the dataset including the image sets and then launch the computer-implemented software tool and apply the machine learning model to process the image data.

Figure 5:
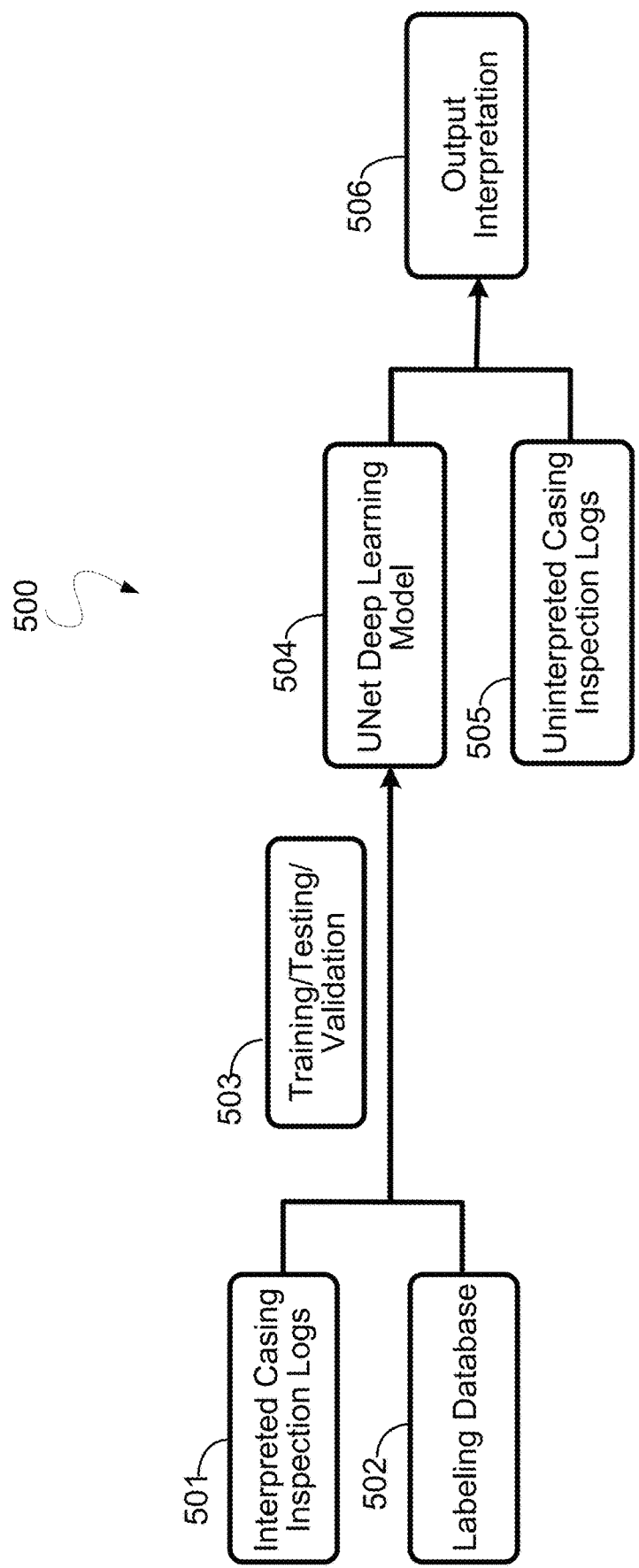
FIG. 5 is a diagram of a machine learning based automatic casing and/or tubing inspection log interpretation workflow by some implementations of the present disclosure.

As illustrated in the diagram 500 of FIG. 5, an implementation may import the labeling database 502 and the corresponding casing and/or tubing inspection logs 501. The implementations may then train a deep leaning model based on the label for a given segment from the labeling database 502 and the associated inspection log for given segment from the interpreted casing and/or tubing inspection logs 501. The implementations may also test the deep learning model using other parts of the labeling database 502, and the associated inspection logs 501. The implementations can continue validating the deep learning model based on, for example, additional labeling and the associated inspection log. After completing the training, testing, and validation (503), the implementations may generate a deep learning model, for example, a UNet deep learning model 504. The implementations may then apply the newly developed UNet deep learning model to uninterpreted casing and/or tubing inspection logs (505) to generate the output interpretation (506), in addition to underground casing or tubing, as illustrated above, the implementations are also applicable to the evaluation of surface pipe integrity where the pipes may run horizontally, rather than vertically, with respect to the ground level.

Figure 6:
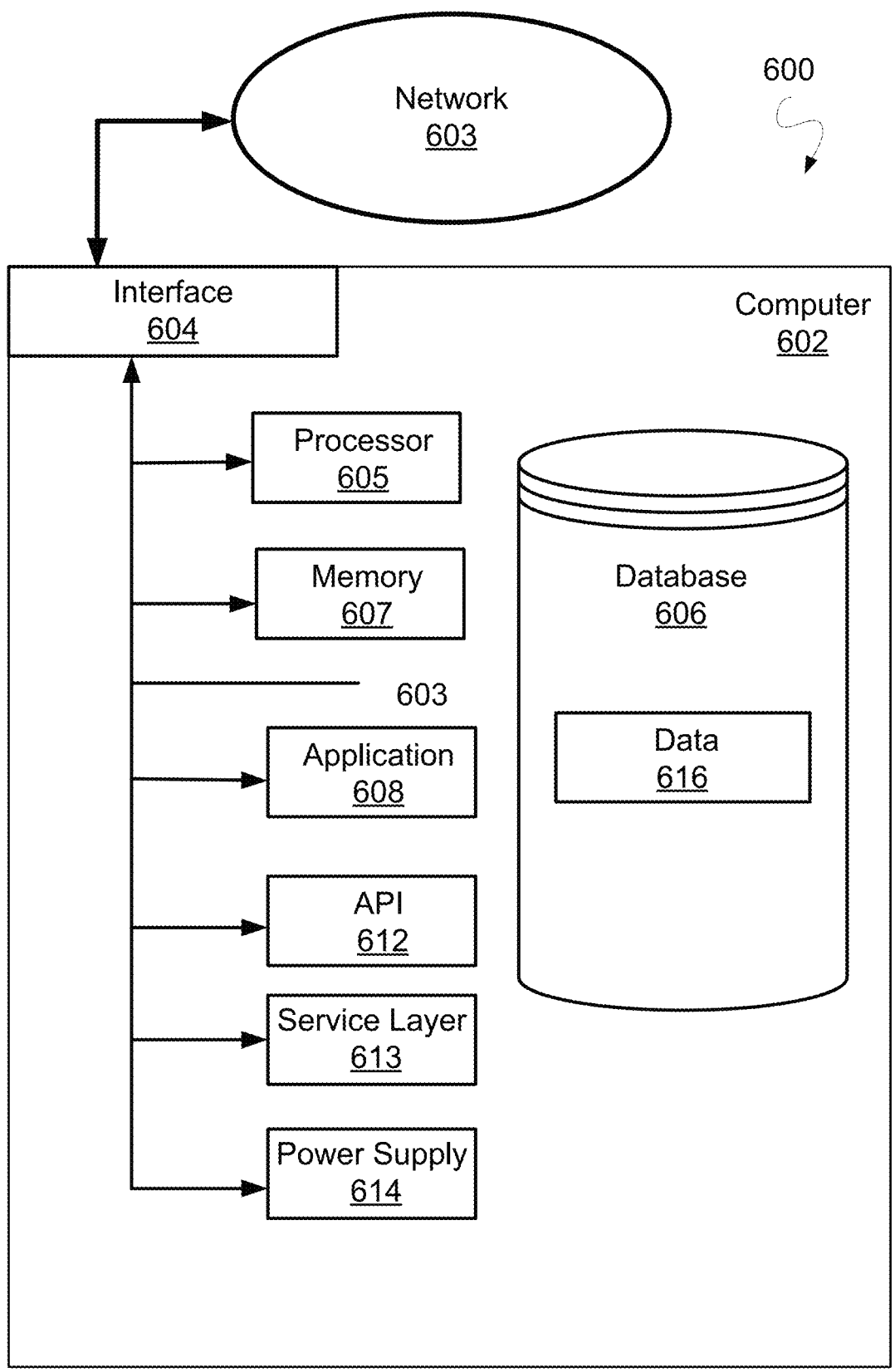
FIG. 6 shows a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 603. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 603 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 603 in a distributed environment. Generally, the interface 604 is operable to communicate with the network 603 and comprises logic encoded in software, hardware, or a combination of software and hardware. More specifically, the interface 604 can comprise software supporting one or more communication protocols associated with communications such that the network 603 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 603 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described data 616 including, for example, multiple streams of data from various sources, such as the training data, the validation data, and the testing data from the inspection logs and the labeling database.

The computer 602 also includes a memory 607 that can hold data for the computer 602, another component or components communicatively linked to the network 603 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 603. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
accessing a first database holding information encoding a set of labels, wherein the set of labels specify a condition of at least one of: a surface pipe, or an underground enclosure, wherein the underground enclosure includes a casing or a tubing, either of which runs at a plurality of depth locations;
accessing a second database holding a plurality of inspection logs, wherein the plurality of inspection logs record measurement data of the at least one of the surface pipe or the underground enclosure that runs at the plurality of depth locations;

based on, at least in part, the set of labels and the plurality of inspection logs, training a deep learning model configured to classify, into the set of labels, the condition of the at least one of the surface pipe or the underground enclosure that runs at the plurality of depth locations, when presented with the inspection logs;

applying the deep learning model to one or more newly received inspection logs containing measurement data of a new surface pipe or a new underground enclosure; and subsequently classifying, into the set of labels, the condition of the new surface pipe or the new underground enclosure.

2. The computer-implemented method of claim 1, wherein the condition of the surface pipe or the underground enclosure characterizes an integrity state of the surface pipe or the underground enclosure.

3. The computer-implemented method of claim 1, wherein the set of labels of the first database is generated based on, at least in part, input from one or more human experts when presented with at least portions of the inspection logs.

4. The computer-implemented method of claim 1, wherein the plurality of inspection logs comprise logs from at least one of: a multi-finger cased-hole caliper tool, a flux-leakage tool, an electromagnetic (EM) phase shift tool, and an ultrasonic imaging tool.

5. The computer-implemented method of claim 4, wherein the plurality of inspection logs include at least one of a low-frequency thickness image and at least one of a high-frequency discrimination image, and wherein the low-frequency thickness image and the high-frequency discrimination image are based on, at least in part, the EM phase shift tool.

6. The computer-implemented method of claim 1, wherein the deep learning model includes a UNet classifier.

7. The computer-implemented method of claim 6, wherein the UNet classifier comprises:
a first stage configured to perform a pixel-level classification and classify each pixel or each patch of pixels into one of a set of integrity labels, and
a second stage of using morphological patterns to discriminate defect patterns according to a respective size of each defect pattern.

8. The computer-implemented method of claim 1, wherein the deep learning model includes a patch-based image classifier configured to operate on patches of pixels.

9. The computer-implemented method of claim 8, wherein the patch-based image classifier incorporates a convolutional neural network (CNN) classifier.

10. The computer-implemented method of claim 9, wherein the CNN classifier comprises:
classifying patches of each inspection image into one of a set of integrity states;
assigning the classified integrity state to a center pixel of the patch; and
averaging over adjacent patches.

11. A computer system comprising one or more computer processors configured to perform operations of:
accessing a first database holding information encoding a set of labels, wherein the set of labels specify a condition of at least one of: a surface pipe, or an underground enclosure, wherein the at least one underground enclosure includes a tubing or a casing, either of which runs at a plurality of depth locations;

accessing a second database holding a plurality of inspection logs, wherein the plurality of inspection logs record measurement data of the at least one of the surface pipe or the underground enclosure that runs at the plurality of depth locations;

based on, at least in part, the set of labels and the plurality of inspection logs, training a deep learning model configured to classify, into the set of labels, the condition of the at least one of the surface pipe or the underground enclosure that runs at the plurality of depth locations, when presented with the inspection logs;

applying the deep learning model to one or more newly received inspection logs containing measurement data of a new surface pipe or a new underground enclosure; and subsequently classifying, into the set of labels, the condition of the new surface pipe or the new underground enclosure.

12. The computer system of claim 11, wherein the condition of the surface pipe or the underground enclosure characterizes an integrity state of the surface pipe or the underground enclosure.

13. The computer system of claim 11, wherein the set of labels of the first database is generated based on, at least in part, input from one or more human experts when presented with at least portions of the inspection logs.

14. The computer system of claim 11, wherein the plurality of inspection logs comprise logs from at least one of: a multi-finger cased-hole caliper tool, a flux-leakage tool, an electromagnetic (EM) phase shift tool, and an ultrasonic imaging tool.

15. The computer system of claim 14, wherein the plurality of inspection logs include at least one of a low-frequency thickness image and at least one of a high-frequency discrimination image, and wherein the low-frequency thickness image and the high-frequency discrimination image are based on, at least in part, the EM phase shift tool.

16. The computer system of claim 11, wherein the deep learning model includes a UNet classifier.

17. The computer system of claim 16, wherein the UNet classifier comprises:
a first stage configured to perform a pixel-level classification and classify each pixel or each patch of pixels into one of a set of integrity labels, and
a second stage of using morphological patterns to discriminate defect patterns according to a respective size of each defect pattern.

18. The computer system of claim 11, wherein the deep learning model includes a patch-based image classifier configured to operate on patches of pixels.

19. The computer system of claim 18, wherein the patch-based image classifier incorporates a convolutional neural network (CNN) classifier.

20. The computer system of claim 19, wherein the CNN classifier comprises:
classifying patches of each inspection image is into one of a set of integrity labels;
assigning the classified integrity state to a center pixel of the patch; and
averaging over adjacent patches.

* * * * *

UNITED STATES PATENT AND TRADEMARK OFFICE
CERTIFICATE OF CORRECTION

PATENT NO. : 12,223,016 B2  
APPLICATION NO. : 17/659215  
DATED : February 11, 2025  
INVENTOR(S) : Chicheng Xu et al.

Page 1 of 1

It is certified that error appears in the above-identified patent and that said Letters Patent is hereby corrected as shown below:

On the Title Page

Column 1, Line 3, please replace "AND/OR" with -- AND --.

In the Specification

In Column 1, Line 3, please replace "AND/OR" with -- AND --.

In Column 1, Line 9, please replace "2022" with -- 2021 --.

Signed and Sealed this  
Thirteenth Day of May, 2025

Coke Morgan Stewart  
*Acting Director of the United States Patent and Trademark Office*